United States Patent
Lang et al.

(10) Patent No.: US 12,524,555 B2
(45) Date of Patent: Jan. 13, 2026

(54) SYSTEMS AND METHODS FOR PROVIDING SECURE DIFFERENTIAL PRIVACY USING CERTIFIABLE RANDOMNESS PROTOCOLS

(71) Applicant: JPMORGAN CHASE BANK, N.A., New York, NY (US)

(72) Inventors: Andrew Lang, Avon, CT (US); Marco Pistoia, Amawalk, NY (US); Omar Amer, New York, NY (US); Shouvanik Chakrabarti, Jersey City, NJ (US); Niraj Kumar, Amsterdam (NL); Pradeep Niroula, College Park, MD (US); Ruslan Shaydulin, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 68 days.

(21) Appl. No.: 18/680,228

(22) Filed: May 31, 2024

(65) Prior Publication Data

US 2025/0371172 A1 Dec. 4, 2025

(51) Int. Cl.
*G06F 21/60* (2013.01)

(52) U.S. Cl.
CPC .......... *G06F 21/602* (2013.01); *G06F 21/606* (2013.01)

(58) Field of Classification Search
CPC .............................. G06F 21/602; G06F 21/606
See application file for complete search history.

(56) References Cited

U.S. PATENT DOCUMENTS

| | | | |
|---|---|---|---|
| 2015/0199178 A1* | 7/2015 | Shi | G06F 7/588 708/254 |
| 2018/0337899 A1* | 11/2018 | Becker | H04L 63/0428 |
| 2021/0247963 A1* | 8/2021 | Buts | G06F 7/58 |
| 2022/0374544 A1* | 11/2022 | Polychroniadou | G06F 21/6254 |

* cited by examiner

*Primary Examiner* — Ayoub Alata
(74) *Attorney, Agent, or Firm* — GREENBERG TRAURIG LLP

(57) ABSTRACT

A method may include: generating, by a plurality of auditor computer programs and a data curator computer program, a first random string using a first distributed randomness protocol; sending the first random string to a quantum party computer program; executing, by the quantum party computer program, a certified randomness protocol with a quantum randomness source using the first random string; receiving, from the quantum randomness source, a first quantum randomness; generating, by the auditor computer programs and the data curator computer program, a second random string using a second distributed randomness protocol; extracting, by the data curator computer program and using a randomness extractor, a second quantum randomness from the first quantum randomness using the second random string, wherein the second quantum randomness comprises a near-uniformly random string; and executing, by the data curator computer program, a differential privacy protocol using the second quantum randomness as additive noise.

20 Claims, 3 Drawing Sheets

SYSTEMS AND METHODS FOR PROVIDING SECURE DIFFERENTIAL PRIVACY USING CERTIFIABLE RANDOMNESS PROTOCOLS

BACKGROUND OF THE INVENTION

1. Field of the Invention

Embodiments relate to systems and methods for providing secure differential privacy using certifiable randomness protocols.

2. Description of the Related Art

Many applications in data analysis and machine learning can be required to compute a statistic on a large corpus of data. The data is often sensitive and concerned with or collected from a large number of independent and unrelated entities, often represented by the respondents to a data collection exercise. The data is usually collected by a trustworthy data curator and may be revealed in two settings.

In a non-interactive setting, the data curator may publish a fixed transcript from the data and all further computation is based only on this transcript. In the interactive setting, the data curator may act as an intermediary between a database and users seeking to compute a statistic based on it. The users are permitted to issue certain queries while the data curator is permitted to modify its responses to protect the privacy of respondents.

The goal of privacy-preserving data analysis is to enable the computation of useful statistics without compromising the privacy of these individual entities. There are many approaches to private data analysis from the point of view of statistics, database theory, and cryptography.

A widely accepted and commonly used notion in private data analysis is that of differential privacy, introduced in Dwork, et al, "Calibrating Noise To Sensitivity In Private Data Analysis," Theory of Cryptography: Third Theory of Cryptography Conference, Proceedings 3, pages 265-284 (2006). A differential privacy protocol provides a guarantee that the outcome of a statistical analysis carried out on a database is not significantly affected by the inclusion/exclusion of any individual entry in the data. It ensures that a respondent incurs insignificant risk by joining the database, despite the fact that the distributional of the computed statistics may disclose information about the population of respondents in general. This notion is formalized in Dwork, et al., "The Algorithmic Foundations Of Differential Privacy," Foundations and Trends in Theoretical Computer Science, 9 (3-4): 211-407 (2014).

Differential privacy is typically ensured by introducing additive noise using an additive noise mechanism. For example, the data curator may add a random perturbation to the queried data before returning it to the querying user or application. The level of additive noise may be chosen so as to ensure differential privacy while still allowing for useful data processing tasks. Differential privacy has become a very successful paradigm with deployments throughout various industries and is required by regulations in some jurisdictions for sensitive applications.

Differential privacy remains subject to two possible concerns arising from the quality of the randomness drawn used in the additive noise mechanism. The first is the compromise of privacy from imperfect randomness. The theoretical safety guarantees of differential privacy only hold if the noise is truly drawn from the specified distribution, or perfect. Even if the noise is slightly imperfect and takes exponentially long time to computationally distinguish from the perfect distribution, the guarantee of lowered risk offered by differential privacy may no longer hold. All classical implementations of differential privacy use pseudorandom rather than truly random noise, and are subject to this vulnerability.

The second concern is the vulnerability to a compromised data curator. The security of differential privacy is paramount on the data curator being independent of the user application. In many practical settings, however, one organization may implement both parts of the mechanism. While audits of the system and software can ensure that the user application only accesses the data after the additive noise mechanism, this does not protect from attacks where the noise is generated by a pseudo-random function where the user application is aware of the seed. In this setting, the user application can invert any noise added by the data curator, rendering all privacy guarantees void. It is almost impossible for an auditor to rule out such a vulnerability as good pseudo-randomness cannot be classically distinguished from true randomness and thus cannot be checked for backdoors, and the noise inversion mechanism can be easily obfuscated in the implementation of the user application.

SUMMARY OF THE INVENTION

Systems and methods for providing secure differential privacy using certifiable randomness protocols. According to an embodiment, a method may include: (1) generating, by a plurality of auditor computer programs, each auditor computer program associated with an auditor, and a data curator computer program associated with a data curator, a first random string using a first distributed randomness protocol; (2) sending, by one or more of the plurality of auditor computer programs and the data curator computer program, the first random string to a quantum party computer program; (3) executing, by the quantum party computer program, a certified randomness protocol with a quantum randomness source using the first random string; (4) receiving, by the quantum party computer program and from the quantum randomness source, a first quantum randomness; (5) generating, by the plurality of auditor computer programs and the data curator computer program, a second random string using a second distributed randomness protocol; (6) extracting, by the data curator computer program and using a randomness extractor, a second quantum randomness from the first quantum randomness using the second random string, wherein the second quantum randomness comprises a near-uniformly random string; and (7) executing, by the data curator computer program, a differential privacy protocol using the second quantum randomness as additive noise.

In one embodiment, the plurality of auditor computer programs and the data curator computer program may select the first distributed randomness protocol and/or the second distributed randomness protocol.

In one embodiment, the first distributed randomness protocol and the second distributed randomness protocol are the same.

In one embodiment, the quantum randomness source comprises a quantum computer.

In one embodiment, the quantum party computer program further receives from the quantum randomness source, certification information.

In one embodiment, the method may also include: verifying, by the auditor computer programs, that the second quantum randomness has a randomness required by the differential privacy protocol.

In one embodiment, the second quantum randomness is used with an additive Laplacian mechanism in the differential privacy protocol.

According to another embodiment, a system may include: a plurality of auditor electronic devices, each auditor electronic device executing an auditor computer program; a data curator electronic device executing a data curator computer program; a quantum party electronic device executing a quantum party computer program; and a quantum randomness source. The plurality of auditor computer programs and the data curator computer program generate a first random string using a first distributed randomness protocol; one or more of the plurality of auditor computer programs and the data curator computer program sends the first random string to the quantum party computer program; the quantum party computer program executes a certified randomness protocol with the quantum randomness source using the first random string; the quantum randomness source provides a first quantum randomness to the quantum party computer program; the plurality of auditor computer programs and the data curator computer program generate a second random string using a second distributed randomness protocol; the data curator computer program extracts, using a randomness extractor, a second quantum randomness from the first quantum randomness using the second random string, wherein the second quantum randomness comprises a near-uniformly random string; and the data curator computer program executes a differential privacy protocol using the second quantum randomness as additive noise.

In one embodiment, the plurality of auditor computer programs and the data curator computer program select the first distributed randomness protocol and/or the second distributed randomness protocol.

In one embodiment, the first distributed randomness protocol and the second distributed randomness protocol are the same.

In one embodiment, the quantum randomness source comprises a quantum computer.

In one embodiment, the quantum party computer program further receives from the quantum randomness source, certification information.

In one embodiment, the auditor computer programs verify that the second quantum randomness has a randomness required by the differential privacy protocol.

In one embodiment, the second quantum randomness is used with an additive Laplacian mechanism in the differential privacy protocol.

According to another embodiment, a non-transitory computer readable storage medium, including instructions stored thereon, which when read and executed by one or more computer processors, cause the one or more computer processors to perform steps comprising: generating a first random string using a first distributed randomness protocol; executing a certified randomness protocol with a quantum randomness source using the first random string; receiving a first quantum randomness from the quantum randomness source; generating a second random string using a second distributed randomness protocol; using a randomness extractor to extract a second quantum randomness from the first quantum randomness using the second random string, wherein the second quantum randomness comprises a near-uniformly random string; and executing a differential privacy protocol using the second quantum randomness as additive noise.

In one embodiment, the first distributed randomness protocol and the second distributed randomness protocol are the same.

In one embodiment, the quantum randomness source comprises a quantum computer.

In one embodiment, the non-transitory computer readable storage medium may also include instructions stored thereon, which when read and executed by the one or more computer processors, cause the one or more computer processors to perform steps comprising: receiving certification information from the quantum randomness source.

In one embodiment, the non-transitory computer readable storage medium may also include instructions stored thereon, which when read and executed by the one or more computer processors, cause the one or more computer processors to perform steps comprising: verifying that the second quantum randomness has a randomness required by the differential privacy protocol.

In one embodiment, the second quantum randomness is used with an additive Laplacian mechanism in the differential privacy protocol.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for providing secure differential privacy using certifiable randomness protocols.

Embodiments may address these and other concerns using protocols for the generation of certifiable randomness with quantum computers. Certified randomness protocols allow for a classical party (e.g., a party using a classical computer) interacting with a trusted quantum computer to verify that a string of random bits was sampled from the output of specified quantum circuits, or otherwise that they are the result of some quantum process. These protocols allow the classical party to bound the min-entropy of the string under certain assumptions on the quantum computer, thereby certifying its randomness. Examples of such protocols are described in Scott Aaronson and Shih-Han Hung, "Certified Randomness From Quantum Supremacy," Proceedings of the 55th Annual ACM Symposium on Theory of Computing, pp. 933-944 (2023); Zvika Brakerski, et al., "A Cryptographic Test Of Quantumness And Certifiable Randomness From A Single Quantum Device," Journal of the ACM 68.5, pp. 1-47 (2021); and Takashi Yamakawa and Mark Zhandry. "Verifiable Quantum Advantage Without Structure," 2022 IEEE 63rd Annual Symposium on Foundations of Computer Science (FOCS), pp. 69-74 (2022). The disclosure of each of these documents is hereby incorporated, by reference, in its entirety.

Figure 1:
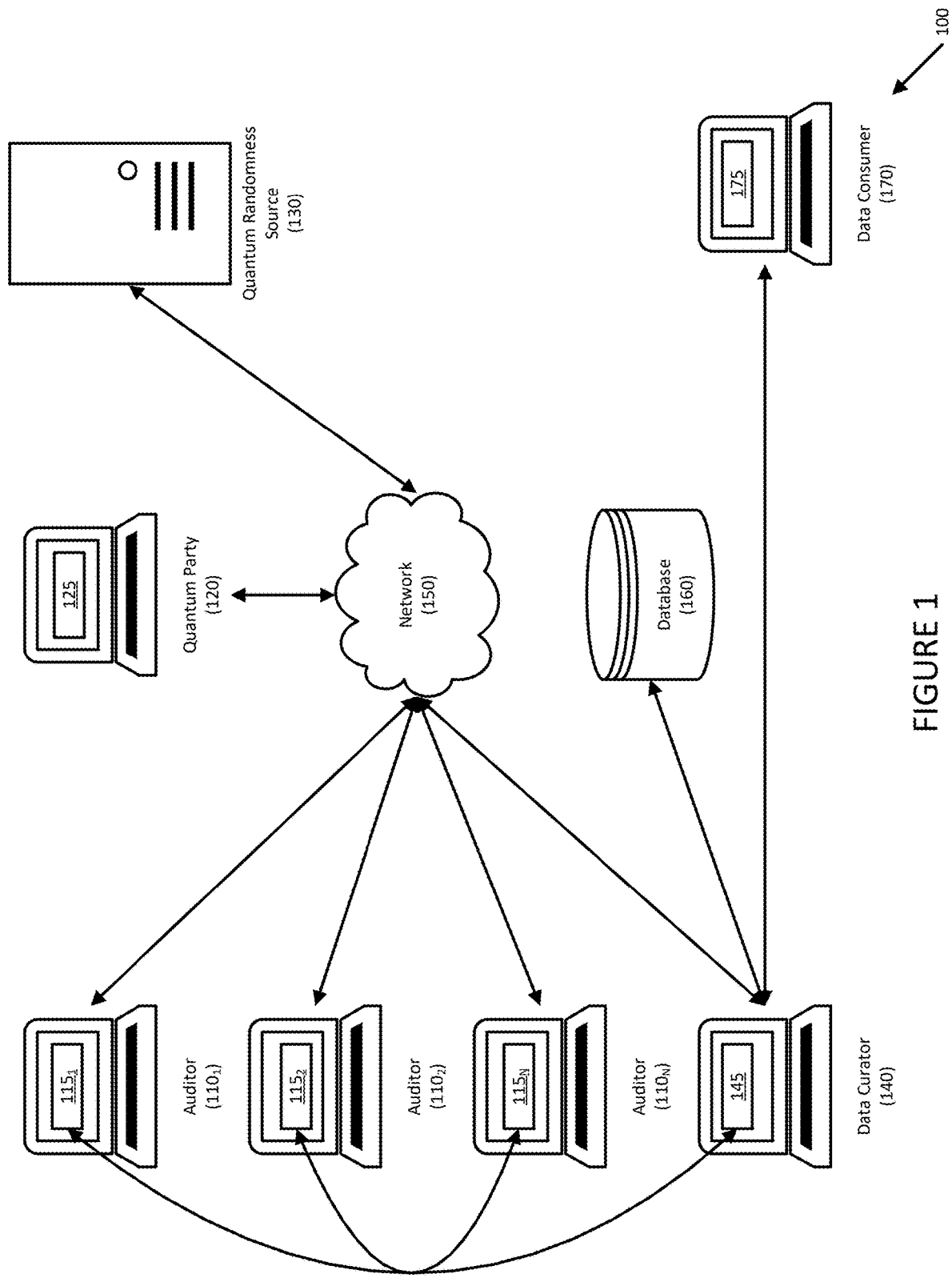
FIG. 1 illustrates a system for providing secure differential privacy using certifiable randomness protocols according to an embodiment.

Referring to FIG. 1, a system for providing secure differential privacy using certifiable randomness protocols is disclosed according to an embodiment. System 100 may include a plurality of auditors 110 (e.g., auditor 1101, auditor 1102, . . . , classical party 110N), and each auditor 110 may execute classical computer program 115 (e.g., auditor computer program 1151, auditor computer program 1152, . . . , auditor computer program 115N) on a classical computing device (e.g., workstation, desktop, laptop, notebook, tablet, etc.), a smart device (e.g., smart phone, smart watch, etc.), an Internet of Things (IoT) appliance, etc. One or more of auditors 110 may interface with quantum randomness source 130 via network 150, which may include, for example, the Internet.

Auditors 110 may interact with each other in order to execute the distributed randomness protocol.

System 100 may further include quantum party 120, which may include a classical computer executing quantum party computer program 125. Quantum party computer program 125 may interface with quantum randomness source 130 over, for example, network 150, and may use a certified randomness protocol to generate quantum randomness (e.g., a sequence of random bits with certifiable randomness).

Quantum randomness source 130 may be a device that performs quantum computations, such as those based on the collective properties of quantum states including superposition, interference, and entanglement.

System 100 may further include data curator 140, which may be a classical party that performs data curation services in the differential privacy protocol. Data curator 140 may execute data curator computer program 145 on a classical computing device. Data curator 140 may execute a differential privacy protocol with an additive noise mechanism based on quantum randomness received as a result of execution of the certified randomness protocol to data in database 160, before the data is provided to data consumer computer program 175 for data consumer 170. Thus, the privacy of the data holders of data in database 160 is guaranteed.

In one embodiment, data curator 140 may be one or auditors 110.

Database 160 may communicate with data curator 140 using a private or encrypted channel.

Data consumer 170, using data consumer computer program 175, may perform analysis on the data with the additive noise mechanism without the privacy of the data holders of the data being compromised.

Figure 2:
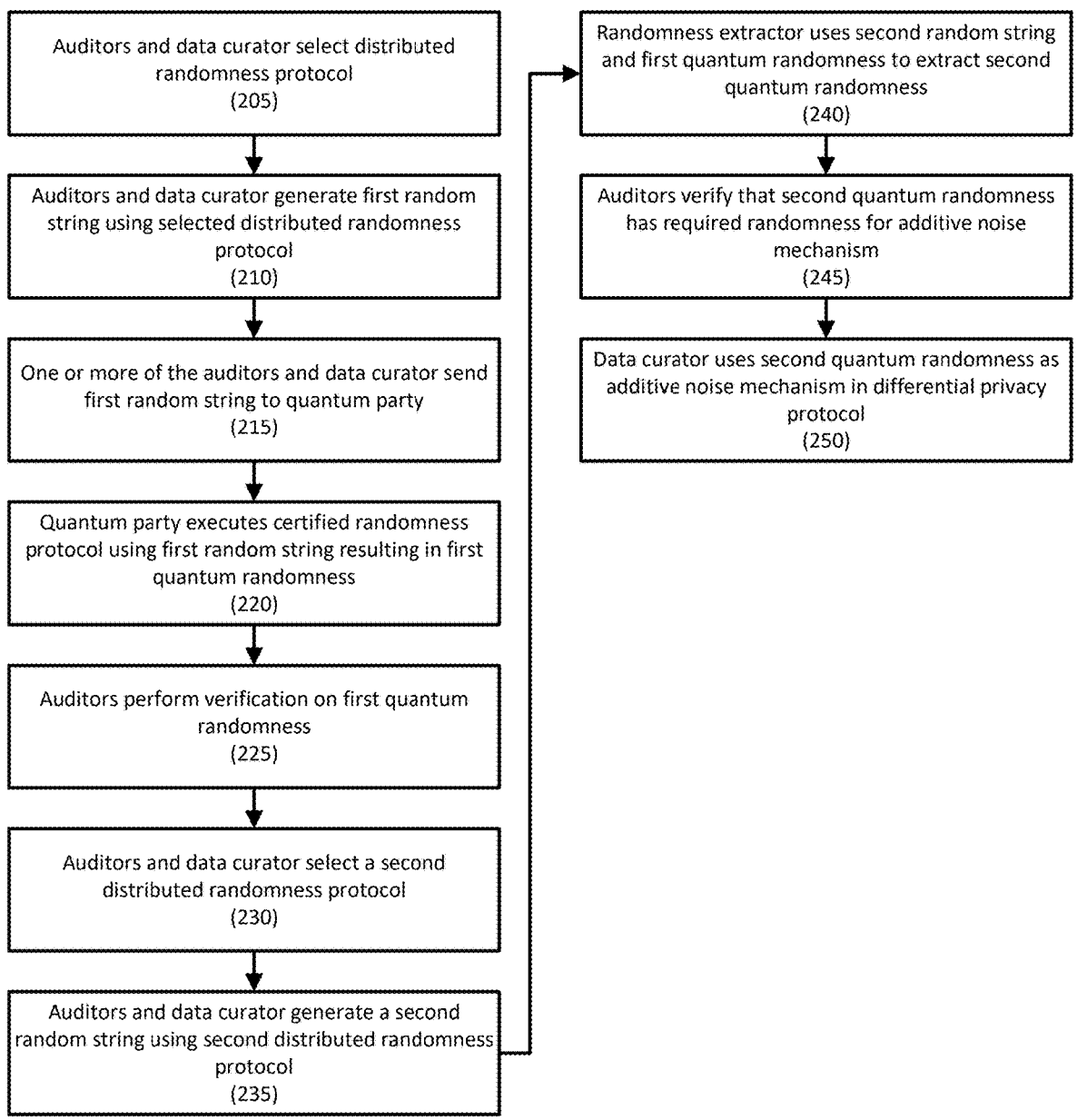
FIG. 2 illustrates a method for providing secure differential privacy using certifiable randomness protocols according to an embodiment.

Referring to FIG. 2, a method for providing secure differential privacy using certifiable randomness protocols is disclosed according to an embodiment.

In step 205, a plurality of auditors and a data curator may select a first distributed randomness protocol based on any security requirements, such as a protocol that is shown to be secure when the majority of the auditors and the data curator are honest. For example, network characteristics (e.g., how freely auditors can abort the protocol) and the maximum number of corrupted auditors are assumptions on the behavior of the network.

In one embodiment, the selection of the first distributed randomness protocol may be defined by the auditors, be specified by regulation, etc.

In some embodiments, non-cryptographic mechanisms may be used to enforce the assumed behavior of the network. For example, economic or social incentives may be used to ensure that parties are not able to freely abort the protocol once started, a quality that is necessary for the security of certain distributed randomness protocols.

Distributed randomness protocols are an example of a secure multiparty computation with various security guarantees depending on various assumptions on complexity theoretic objects (e.g., one-way functions, oblivious transfer, etc.) and/or the number of corrupted parties. Distributed randomness protocols allow participants with some uniformly random input strings to agree on one (potentially smaller) string of near uniform values, even if some are trying to bias the protocol. This is in contrast to the jointly certifiable randomness protocol discussed below, which allows participants to expand their input randomness into a larger string, and allows participants to certify the randomness of the output. Examples of distributed random protocols are described in Manuel Blum, "Coin flipping by telephone a protocol for solving impossible problems," ACM SIGACT News 15.1, pp. 23-27 (1983); Amos Beimel, Eran Omri, and Ilan Orlov, "Protocols for multiparty coin toss with a dishonest majority," Journal of Cryptology, 28.3, pp. 551-600 (2015); and Shafi Goldwasser, Yael Tauman Kalai, and Sunoo Park, "Adaptively secure coin-flipping, revisited," International Colloquium on Automata, Languages, and Programming, pp. 663-674 (2015). The disclosure of each of these documents is hereby incorporated, by reference, in its entirety.

In step 210, the plurality of auditors and the data curator may use the selected first distributed randomness protocol to generate and agree to a first random string. The first random string may include a plurality of random bits that are the output of the distributed randomness protocol.

In one embodiment, the first random string is smaller than the quantum randomness output as a result of a certified randomness protocol. In addition, the first random string cannot be verified and must be trusted, while the quantum randomness is certifiable.

In step 215, one or more of the auditors and/or the data curator may send the first random string to a quantum party, such as a party that has access to a quantum randomness source (e.g., a quantum computer). Although only one party can send the random string to the quantum party, having multiple parties send the random string to the quantum party may ensure robustness in case one party declines to send it.

In one embodiment, the data curator may send the first random string to the quantum party.

In step 220, the quantum party, using a computer program, may execute a certified randomness protocol using the first random string as an input to generate a first quantum randomness, such as a sequence of random bits, along with any certification information needed by the underlying certified randomness protocol to verify that randomness. An example of a certified randomness protocol is disclosed in U.S. patent application Ser. No. 18/679,638, filed concurrently herewith, to Eloul, et al., entitled "Systems And Methods For Blockchain-Based Certified Random Function Using Quantum Random Circuit Generator," and in U.S. patent application Ser. No. 18/625,605, the disclosure of each of which is hereby incorporated, by reference, in its entirety.

For example, in certifiable randomness protocols based on random circuits, certification information can include both the circuit descriptions and outputs of the circuits. Examples of such are described in Scott Aaronson and Shih-Han Hung, "Certified Randomness From Quantum Supremacy," Proceedings of the 55th Annual ACM Symposium on Theory of Computing, pp. 933-944 (2023), the disclosure of which is hereby incorporated, by reference, in its entirety.

Examples of certification information may include additional bits that may not be random themselves but provide information about the internal state of the quantum randomness source that may be used to verify that the random bits are indeed random.

In step 225, the auditors may verify that (a) the first quantum randomness was randomly selected as the auditors and the data curator each played a role in selecting the first random string and (b) that the first quantum randomness and the certification information are a valid output of the certified randomness protocol using the first random string as input. The certification protocol that is used may be based on the certified randomness protocol that was used and may use the first random string and any certification information. Thus, the first quantum randomness has the randomness guaranteed by the certified randomness protocol.

In step 230, the auditors and the data curator may select a second distributed randomness protocol. This may be the same as the first distributed randomness protocol selected in step 205, or it may be a different distributed randomness protocol.

In step 235, the plurality of auditors and the data curator may use the selected distributed randomness protocol to generate and agree to a second random string.

In step 240, a function, such as a randomness extractor, may use the second random string and the first quantum randomness to extract second quantum randomness. Examples of randomness extractors are described in Foreman et al, "Cryptomite: A Versatile And User-Friendly Library Of Randomness Extractors," (2024) available at arxiv.org/abs/2402.09481, the disclosure of which is hereby incorporated, by reference, in its entirety.

For example, the data curator may execute the randomness extractor, as it uses the second quantum randomness as additive noise. The auditors may also execute the randomness extractor to verify that it has been executed properly. For example, the randomness extractor may take the first quantum randomness, which is not near-uniformly random, but can be verified to have entropy, and using the second random string, which is uniformly random, may produce the second quantum randomness, which is a near-uniformly random string having the same length as the first quantum randomness.

A uniformly random string is one that takes all possible values with equal probability. A near-uniformly random string takes all possible values with almost equal probability. A string that is not near-uniformly random may have significantly different probabilities for outcomes (like tossing a biased coin: still random, but not uniform).

In step 245, the auditors verify that the second quantum randomness has the required randomness for additive noise mechanism. The total required randomness may be the number of near-uniform bits needed, which may be determined by the differential privacy protocol that is used.

For example, the auditors may verify that the first quantum randomness (before the randomness extractor is applied) has a certain amount of entropy, such as a certain number of bits of entropy. The randomness extractor guarantees that if the input has a number of bits of entropy, the output will include the same number of near-uniform bits.

It is notable that certain distributed randomness protocols and network scenarios may result in the random string exhibiting some bias, in which case the output of the described protocol may also exhibit some bias or otherwise fall short of the desired security properties. Embodiments may use different combinations of distributed randomness protocols, certified randomness protocols, and network settings, achieving qualitatively or quantitatively different guarantees according to each combination.

For example, a network setting that may be used to counter bias may forbid the participating parties from aborting the protocol or connection while the audit is proceeding.

In step 250, the data curator may introduce the second quantum randomness as an additive noise mechanism in a differential privacy protocol. The manner in which the second quantum randomness is used may depend on the differential privacy protocol. The data curator may use the additive noise mechanism before data in a database is provided to a data consumer.

In one embodiment, the second quantum randomness may be used with an additive Laplacian mechanism. For example, a data consumer, such as a party attempting to perform data analysis on data, may query a function $f$ on a database x where $f(x)$ is a k dimensional vector that represents the true answer. In the additive noise mechanism, the data curator may use the uniformly random bits of the second quantum randomness to draw k samples $Y_1, \ldots, Y_k$ from a Laplacian distribution whose probability density is given by $$\frac{\epsilon}{2\Delta f}\exp\left(-\frac{|y|\epsilon}{\Delta f}\right),$$

where $\epsilon$ is a small parameter describing the privacy loss, and $\Delta f$ quantifies the sensitivity of the query $f$. The data curator may then return $f(x)+(Y_1, \ldots, Y_k)$.

Thus, the privacy of the parties with data in the database is guaranteed.

Figure 3:
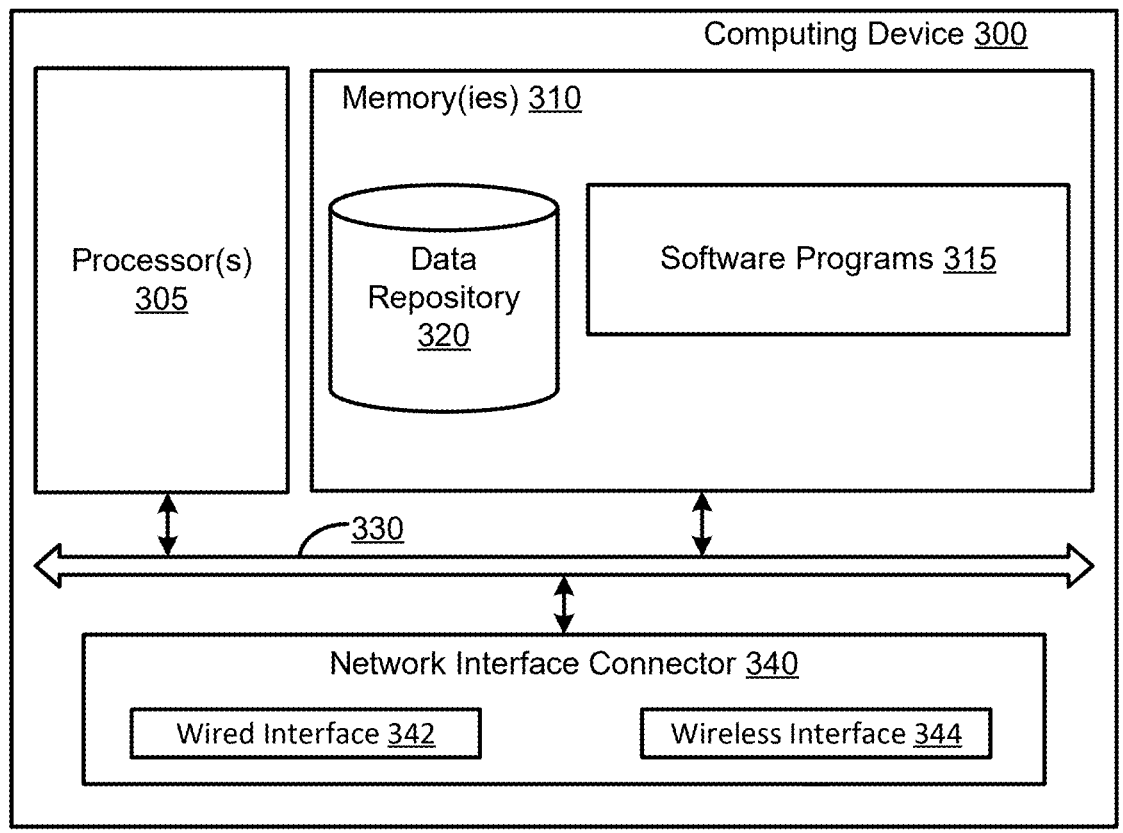
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

The disclosure of U.S. patent application Ser. No. 18/625, 633 is hereby incorporated, by reference, in its entirety.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
generating, by a plurality of auditor computer programs, each auditor computer program associated with an auditor, and a data curator computer program associated with a data curator, a first random string using a first distributed randomness protocol;
sending, by one or more of the plurality of auditor computer programs and the data curator computer program, the first random string to a quantum party computer program;
executing, by the quantum party computer program, a certified randomness protocol with a quantum randomness source using the first random string;
receiving, by the quantum party computer program and from the quantum randomness source, a first quantum randomness;
generating, by the plurality of auditor computer programs and the data curator computer program, a second random string using a second distributed randomness protocol;
extracting, by the data curator computer program and using a randomness extractor, a second quantum randomness from the first quantum randomness using the second random string, wherein the second quantum randomness comprises a near-uniformly random string; and
executing, by the data curator computer program, a differential privacy protocol using the second quantum randomness as additive noise.

2. The method of claim 1, wherein the plurality of auditor computer programs and the data curator computer program select the first distributed randomness protocol and/or the second distributed randomness protocol.

3. The method of claim 1, wherein the first distributed randomness protocol and the second distributed randomness protocol are the same.

4. The method of claim 1, wherein the quantum randomness source comprises a quantum computer.

5. The method of claim 1, wherein the quantum party computer program further receives from the quantum randomness source, certification information.

6. The method of claim 1, further comprising:
verifying, by the auditor computer programs, that the second quantum randomness has a randomness required by the differential privacy protocol.

7. The method of claim 1, wherein the second quantum randomness is used with an additive Laplacian mechanism in the differential privacy protocol.

8. A system, comprising:
a plurality of auditor electronic devices, each auditor electronic device executing an auditor computer program;
a data curator electronic device executing a data curator computer program;
a quantum party electronic device executing a quantum party computer program; and
a quantum randomness source;
wherein:
the plurality of auditor computer programs and the data curator computer program generate a first random string using a first distributed randomness protocol;
one or more of the plurality of auditor computer programs and the data curator computer program sends the first random string to the quantum party computer program;
the quantum party computer program executes a certified randomness protocol with the quantum randomness source using the first random string;

the quantum randomness source provides a first quantum randomness to the quantum party computer program;

the plurality of auditor computer programs and the data curator computer program generate a second random string using a second distributed randomness protocol;

the data curator computer program extracts, using a randomness extractor, a second quantum randomness from the first quantum randomness using the second random string, wherein the second quantum randomness comprises a near-uniformly random string; and the data curator computer program executes a differential privacy protocol using the second quantum randomness as additive noise.

9. The system of claim 8, wherein the plurality of auditor computer programs and the data curator computer program select the first distributed randomness protocol and/or the second distributed randomness protocol.

10. The system of claim 8, wherein the first distributed randomness protocol and the second distributed randomness protocol are the same.

11. The system of claim 8, wherein the quantum randomness source comprises a quantum computer.

12. The system of claim 8, wherein the quantum party computer program further receives from the quantum randomness source, certification information.

13. The system of claim 8, wherein the auditor computer programs verify that the second quantum randomness has a randomness required by the differential privacy protocol.

14. The system of claim 8, wherein the second quantum randomness is used with an additive Laplacian mechanism in the differential privacy protocol.

15. A non-transitory computer readable storage medium, including instructions stored thereon, which when read and executed by one or more computer processors, cause the one or more computer processors to perform steps comprising:

generating a first random string using a first distributed randomness protocol;

executing a certified randomness protocol with a quantum randomness source using the first random string;

receiving a first quantum randomness from the quantum randomness source;

generating a second random string using a second distributed randomness protocol;

using a randomness extractor to extract a second quantum randomness from the first quantum randomness using the second random string, wherein the second quantum randomness comprises a near-uniformly random string; and executing a differential privacy protocol using the second quantum randomness as additive noise.

16. The non-transitory computer readable storage medium of claim 15, wherein the first distributed randomness protocol and the second distributed randomness protocol are the same.

17. The non-transitory computer readable storage medium of claim 15, wherein the quantum randomness source comprises a quantum computer.

18. The non-transitory computer readable storage medium of claim 15, further including instructions stored thereon, which when read and executed by the one or more computer processors, cause the one or more computer processors to perform steps comprising:

receiving certification information from the quantum randomness source.

19. The non-transitory computer readable storage medium of claim 15, further including instructions stored thereon, which when read and executed by the one or more computer processors, cause the one or more computer processors to perform steps comprising:

verifying that the second quantum randomness has a randomness required by the differential privacy protocol.

20. The non-transitory computer readable storage medium of claim 15, wherein the second quantum randomness is used with an additive Laplacian mechanism in the differential privacy protocol.

* * * * *